United States Patent
Candelaria et al.

(10) Patent No.: US 9,514,072 B1
(45) Date of Patent: *Dec. 6, 2016

(54) MANAGEMENT OF ALLOCATION FOR ALIAS DEVICES

(71) Applicant: International Business Machines Corporation, Armonk, NY (US)

(72) Inventors: Susan K. Candelaria, Tucson, AZ (US); Scott B. Compton, Hyde Park, NY (US); Deborah A. Furman, Staatsburg, NY (US); Ilene A. Goldman, Poughkeepsie, NY (US); Matthew J. Kalos, Tucson, AZ (US); John R. Paveza, Morgan Hill, CA (US); Beth A. Peterson, Tucson, AZ (US); Dale F. Riedy, Poughkeepsie, NY (US); David M. Shackelford, Tucson, AZ (US); Harry M. Yudenfriend, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/067,702

(22) Filed: Mar. 11, 2016

Related U.S. Application Data

(63) Continuation of application No. 14/753,078, filed on Jun. 29, 2015.

(51) Int. Cl.
| | |
|---|---|
| G06F 5/00 | (2006.01) |
| G06F 3/00 | (2006.01) |
| G06F 13/362 | (2006.01) |
| G06F 9/50 | (2006.01) |
| G06F 13/42 | (2006.01) |

(52) U.S. Cl.
CPC .......... *G06F 13/362* (2013.01); *G06F 9/5038* (2013.01); *G06F 9/5083* (2013.01); *G06F 13/4221* (2013.01)

(58) Field of Classification Search
CPC ................................ G06F 3/061; G06F 13/30
See application file for complete search history.

(56) References Cited

U.S. PATENT DOCUMENTS

| | | | |
|---|---|---|---|
| 8,881,165 B2 | 11/2014 | Chambliss et al. | |
| 2008/0104589 A1 | 5/2008 | McCrory et al. | |
| 2010/0082855 A1* | 4/2010 | Accapadi | G06F 13/362 710/39 |
| 2014/0130055 A1 | 5/2014 | Guha | |
| 2014/0195699 A1* | 7/2014 | Sokol, Jr. | G06F 13/18 710/40 |
| 2014/0250440 A1 | 9/2014 | Carter et al. | |
| 2015/0081948 A1* | 3/2015 | Thereska | G06F 3/061 711/103 |

* cited by examiner

*Primary Examiner* — Hyun Nam
(74) *Attorney, Agent, or Firm* — Erik K. Johnson

(57) ABSTRACT

An input/output (I/O) request is received that indicates a priority for performing the received I/O request by a storage controller. If a base device is not available to handle the received I/O request, whether the received I/O request is eligible for performance throttling is determined. The received I/O request is transmitted to the storage controller indicating whether the received I/O request is eligible for performance throttling. An alias device is allocated to the base device based on the priority for performing the received I/O request. If the throttling information received from the storage controller for the previous I/O request indicates that a request type of the received I/O request is not being throttled, and it is determined that the received I/O request is a new request, then a control block is representing the base device is flagged, indicating that the received I/O request is eligible for performance throttling.

1 Claim, 5 Drawing Sheets

MANAGEMENT OF ALLOCATION FOR ALIAS DEVICES

STATEMENT REGARDING PRIOR DISCLOSURES BY THE INVENTOR OR A JOINT INVENTOR

Aspects of the present invention have been disclosed by another, who obtained the subject matter disclosed directly from the inventors, in the product IBM DS8870, made available to the public on Dec. 5, 2014. These aspects, as they may appear in the claims, may be subject to consideration under 35 U.S.C. §102(b)(1)(A).

BACKGROUND OF THE INVENTION

The present invention relates generally to the management of computing devices, and more particularly to managing alias devices in a computing environment to optimize processing of I/O requests.

Data storage devices are used for storing and retrieving digital information. Often input/output (I/O) requests are to be executed by a storage controller to the data storage devices in order to perform necessary read/write operations for a particular process. Typically, in a multi-system environment, a large number of incoming I/O requests can be processed by base devices, alias devices, and eventually executed by the storage controller. For example, in System z®, each I/O device is defined to the I/O configuration and is represented by a sub-channel in a processor and a unit address in the storage controller. When an I/O request is issued to a device, only one I/O request can be active on the sub-channel at a time. Therefore, if multiple I/O requests for a device arrive at the same time, a portion of those I/O requests may be queued internally by the operating system and accumulate I/O queuing time delay. In System z® environments, parallel access volumes (PAVs) may be implemented to address this queueing time delay. With PAV, one or more alias devices can be configured that are used to perform I/O requests to the base device, when the sub-channel for the base device is busy with another I/O request. Alias devices do not represent an actual logical volume on the storage controller; rather they simply provide a pathway (i.e., a sub-channel) that allows System z® to do more than one I/O operation in parallel to the same base device.

Typically, there are a number of models used to manage PAV aliases. The most efficient model with regard to performing multiple I/O requests is called HyperPAV. Prior to System z® implementing a HyperPAV model, alias devices were bound to a particular base device for a period of time and moved when needed to another base device. However, aliases were moved infrequently and only after the workload experienced I/O queuing delays. Usually, with a HyperPAV model, alias devices are put into a pool and used only for the duration of an I/O request and then they are put back into the pool. This allows less alias devices to be defined since their usage is managed more efficiently.

In one example where a HyperPAV model is implemented, base devices may experience delays when performing a large number of queued I/O requests. In this instance, alias devices may be more likely to be selected and assigned to the base devices that are experiencing processing delays, which may result in unwarranted consumption of alias devices in the alias device pool. Accordingly, the consumed alias devices will be unavailable to perform I/O requests for base devices that are not experiencing processing delays.

For example, for disaster recovery purposes, an Extended Remote Copy (XRC) process may be implemented to copy data asynchronously from a local site to a remote site. In this instance, the remote site may read data from a local device in a local site over a long distance link. Furthermore, data may be written to the local device from the local site at a faster rate than a remote device in the remote site can read from the local device over the long distance link. Accordingly, a storage controller that controls the local device will inject delays for write requests that are being issued from the local site. This delay, known as XRC pacing delay, allows the remote site to catch up on performing read requests for copying data asynchronously.

In another example, a storage controller with a hard disk drive (HDD) may process a write operation of an I/O request. Furthermore, the write operation is processed by first copying data to be written to a non-volatile storage (e.g., cache memory within the storage controller) and then eventually de-staging the data to be written to a storage device. In this instance, if a large number of write operations, or a large amount of data for each write operation is generated, then the storage controller may not be able to synchronously process the write operations at the rate in which write operations are being generated, since it is not able to de-stage the data already in non-volatile storage fast enough. Typically, in this manner, a processing delay may occur for write operations, and can affect a process for a subset of base and alias devices to perform necessary I/O requests.

In yet another example, a storage controller may limit access to its resources (memory, CPU, disk drives etc.) based on an I/O request importance level. Usually, if there is contention for its resources, the storage controller may internally delay lower importance I/O requests to allow higher importance I/O requests to get access to those resources.

In yet another example, a storage controller may implement storage tiers, such that data not recently referenced by storage computer system may be migrated to slower storage tiers. In this instance, once the data is moved to a slower storage tier, additional time may be required to retrieve the data the next time the data is referenced. For example, the storage controller may implement a first storage tier which may involve delaying I/O requests for an amount of time it takes to spin a disk of a storage device (i.e., a platter of a HDD). In another example, the storage controller may implement a second storage tier which may involve delaying I/O requests for an amount of time it takes to retrieve data from a tape storage device. Accordingly, this delay as a result of implementing storage tiers can affect a process for a subset of base and alias devices to perform necessary I/O requests.

SUMMARY

Embodiments of the present invention provide systems, methods, and computer program products for managing input/output (I/O) requests in a computing environment. An input/output (I/O) request is received that indicates a priority for performing the received I/O request by a storage controller. Responsive to determining that a base device is not available to handle the received I/O request, whether the received I/O request is eligible for performance throttling is determined, based on the priority for performing the received I/O request, throttling information received from the storage controller for a previous I/O request, and one or more characteristics of the received I/O request, wherein the one or more characteristics of the received I/O request include: types of write operations for the received I/O request, types of read operations for the received I/O request, and amounts of data involved in one or more write operations or read operations for the received I/O request. The received I/O request is transmitted to the storage controller with an indication of whether the received I/O request is eligible for performance throttling. One or more of a plurality of alias devices are allocated to the base device based on the priority for performing the received I/O request and a number of the plurality of alias devices in use. Responsive to determining that the throttling information received from the storage controller for the previous I/O request indicates that a request type of the received I/O request is not being throttled, whether the received I/O request is a new request is determined. Responsive to determining that the received I/O request is a new request, a control block representing the base device is flagged, indicating that the received I/O request is eligible for performance throttling.

DETAILED DESCRIPTION

Embodiments of the present invention provide systems and methods to manage allocation of a plurality of alias devices to perform I/O requests in a computing environment. Embodiments of the present invention can provide systems and methods to prioritize performing the I/O request based, at least in part, on an importance level for the I/O request. Furthermore, embodiments of the present invention may provide systems and methods to manage a processing delay by determining a manner to allocate one of the plurality of alias devices.

Figure 1:
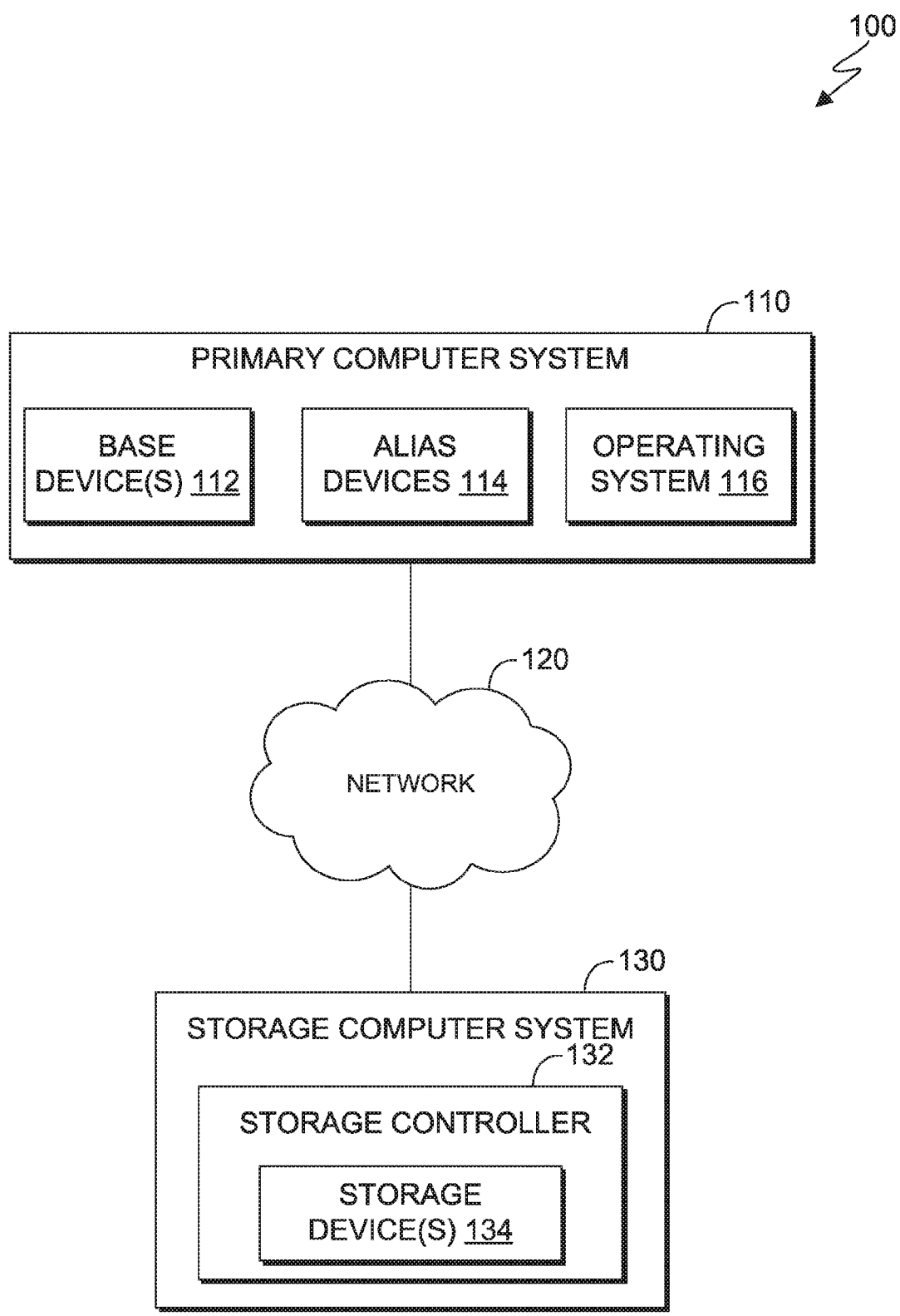
FIG. 1 is a block diagram of a computing environment, in accordance with an embodiment of the present invention.

FIG. 1 is a functional block diagram of computing environment 100, in accordance with an embodiment of the present invention. Computing environment 100 includes primary computer system 110 and storage computer system 130, interconnected via network 120. Primary computer system 110 and storage computer system 130 can be desktop computers, laptop computers, specialized computer servers, or any other computer systems known in the art. In certain embodiments, primary computer system 110 and storage computer system 130 represent computer systems utilizing clustered computers and components to act as a single pool of seamless resources when accessed through network 120. For example, such embodiments may be used in data center, cloud computing, storage area network (SAN), and network attached storage (NAS) applications. In certain embodiments, primary computer system 110 and storage computer system 130 represent virtual machines. In general, primary computer system 110 and storage computer system 130 are representative of any electronic devices, or combination of electronic devices, capable of executing machine-readable program instructions, as described in greater detail with regard to FIG. 5.

Primary computer system 110 includes one or more base devices 112, a plurality of alias devices 114, and operating system 116. Primary computer system 110 may generate input/output (I/O) requests to be performed by base devices 112 and/or alias devices 114. For example, an operation of primary computer system 110 may involve moving data from primary computer system 110 to one of storage devices 134 in storage computer system 130. In this instance, one or more I/O requests are performed by primary computer system 110 and components therein to facilitate movement of the data from primary computer system 110 to one of storage devices 134. In one embodiment, primary computer system 110 is configured for multiple logical partitions to share machine resources. Each logical partition runs an instance of operating system 116 (e.g., z/OS®, z/VM®, z/Linux etc.). In this instance, if multiple logical partitions can access the same device (e.g., one of a plurality of alias devices 114 or one of one or more base devices 112), then each of the multiple logical partitions has their own sub-channels for the respective devices. Furthermore, operating system 116, such as z/VM®, may support multiple guests (i.e., operating system 116 images) running on top of it. Furthermore, each guest would have its own virtual sub-channel assigned by z/VM®. Accordingly, there is one sub-channel per device, wherein the device may be one of a plurality of alias devices 114 or one of one or more base devices 112. In this embodiment, the I/O request is performed by primary computer system 110 and components therein by executing a read/write operation to one of storage devices 134. In this embodiment, only one sub-channel can be active to perform an I/O request in primary computer system 110 at a time. Furthermore, there is no restriction regarding a number of sub-channels active to perform an I/O request. For example, if there are two base devices 112 and three alias devices 114, then five sub-channels may be active for each of five operating system 116 images (i.e., an instance of operating system 116 running on a processor of primary computer system 110). Stated differently, each operating system 116 image may only perform one I/O request at a time to each of its sub-channels. In another example, a large number of I/O requests for a single device (i.e., one of one or more base devices 112 or one of the plurality of alias devices 114) may be required to be performed. In this instance, a processing delay (i.e., queue time) will occur at the device level if the number of concurrent I/O requests exceed the number of aliases at any point in time.

Each of one or more base devices 112 represents a single logical volume on storage controller 132 and interacts with operating system 116 and the plurality of alias devices 114 to perform I/O requests. An I/O request may be received for base device 112 that is available to perform an I/O request (i.e., an available logical volume). In this instance, the first of base device 112 has an associated sub-channel (i.e., pathway) to interact with storage controller 132 in order to perform the I/O request. In another example, an I/O request may be performed by a first of the plurality of alias devices 114, if base device 112 is unavailable to perform the I/O request. In this instance, computing environment 100 may utilize a HyperPAV model, wherein the first of the plurality of alias devices 114 is selected from a pool of alias devices 114 and assigned to base device 112 that is unavailable to perform the I/O request, such that the first of the plurality of alias devices 114 is configured to perform the I/O request.

Furthermore, the first of the plurality of alias devices 114 is returned to the pool of alias devices 114 after completing the I/O request.

Alias devices 114 are additional devices that are used by operating system 116 to perform I/O requests to base device 112 when base device 112 is busy with another I/O operation. In this embodiment, each of the plurality of alias devices 114 is assigned a sub-channel to perform an I/O request. In one embodiment, computing environment 100 may utilize a HyperPAV model to perform a number of I/O requests in parallel and reduce a potential processing delay resulting from a large number of queued I/O requests. Furthermore, the HyperPAV model is implemented to service a workload (i.e., performing a number of I/O requests) more effectively (i.e., using a lesser number of alias devices) compared to other parallel access volume (PAV) models. For example, another PAV process (i.e., static PAV) may rigidly assign a first of a plurality of alias devices 114 to base device 112, regardless of whether base device 112 is available to perform an I/O request. In this instance, a particular workload may have a longer processing delay and use a greater number of alias devices 114 when computing environment 100 implements a static PAV model compared to a HyperPAV model.

Operating system 116 is software that manages primary computer system 110 hardware, software resources of primary computer system 110, and provides common services for primary computer system 110 programs. In another embodiment, storage computer system 130 may be a part of primary computer system 110, in which case, operating system 116 also manages storage computer system 130 hardware, software resources of storage computer system 130, and provides common services for storage computer system 130 programs. In this embodiment, operating system 116 manages one or more devices of the primary computer system 110 (e.g., determining if one of base devices 112 is available to perform an I/O request, managing selection and assignment of each of the plurality of alias devices 114 in the pool of alias devices 114, etc.), and processing of I/O requests (e.g., queueing I/O requests, determination of importance levels for I/O requests, throttling I/O requests, starting I/O requests etc.).

Network 120 can be, for example, a local area network (LAN), a wide area network (WAN) such as the Internet, or a combination of the two, and include wired, wireless, or fiber optic connections. In general, network 120 can be any combination of connections and protocols that will support communications between primary computer system 110 and storage computer system 130, in accordance with a desired embodiment of the invention.

Storage computer system 130 is secondary computer system containing storage controller 132. In this embodiment, storage computer system 130 is a separate computer system from primary computer system 110 and is configured to contain one or more storage devices 134 managed by storage controller 132. In another embodiment, storage computer system 130 and components therein may be disposed within primary computer system 110.

It should be understood that, for illustrative purposes, FIG. 1 does not show other computer systems and elements which may be present when implementing embodiments of the present invention. For example, while FIG. 1 shows a single primary computer system 110 and a storage computer system 130, computing environment 100 can also include more than one primary computer system 110 and storage computer system 130. Furthermore, words such as "first"
and "second" are used herein for convenience of description and do not imply any specific ordering.

Figure 2:
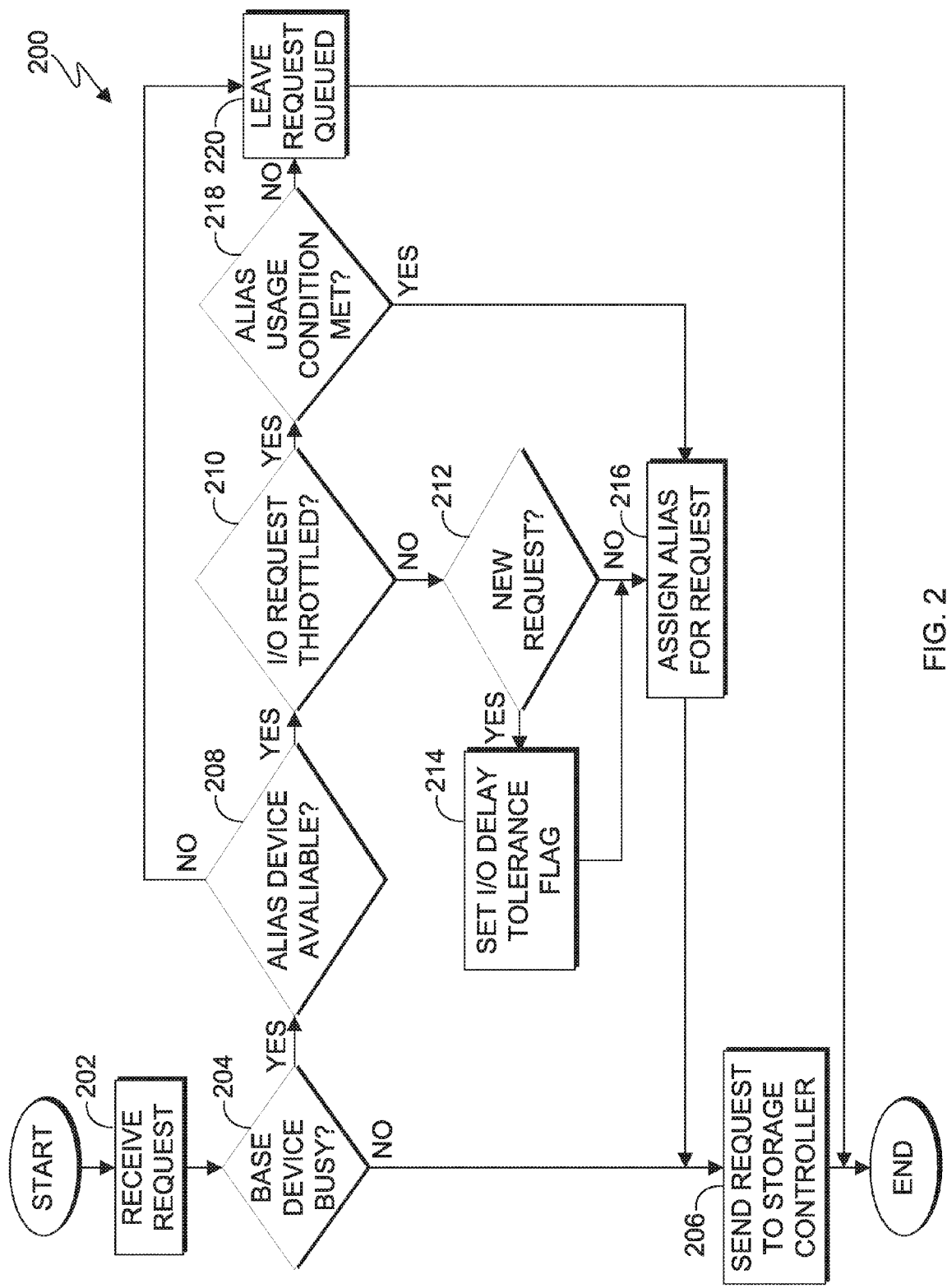
FIG. 2 is a flowchart illustrating operational steps for sending an I/O request to a storage controller, in accordance with an embodiment of the present invention.

FIG. 2 is a flowchart 200 illustrating operational steps for sending an I/O request to storage controller 132, in accordance with an embodiment of the present invention. In this embodiment, operating system 116 performs operational steps described herein. Furthermore, the I/O request performed by primary computer system 110 and components therein has an associated importance level. The phrase, "importance level," as used herein, indicates a priority for performing the I/O request. For example, an I/O request having a high importance level (e.g., an importance level of 1 or 2) is handled differently compared to an I/O request having a medium importance level (e.g., an importance level of 3 or 4) or having a low importance level (e.g., an importance level of 5). In this embodiment, throttling an I/O request involves delaying a process to perform the I/O request in accordance with a condition (e.g., importance level of the I/O request, etc.). It should be understood that in this embodiment an importance level of 5 is less important than an importance level of 4, 3, 2, and 1 for an I/O request. Furthermore, in this embodiment, five importance levels are implemented to categorize an I/O request. In other embodiments, a lesser or greater number of importance levels may be implemented, as well as other numbering models, and/or other methods to categorize an I/O request.

In step 202, operating system 116 receives an I/O request. In this embodiment, operating system 116 receives the I/O request from an application of primary computer system 110. Furthermore, the application of primary computer system 110 may submit one or more I/O requests, wherein each of the one or more I/O requests is to be performed by base device 112 or one of a plurality of alias devices 114. For example, the application can generate application data to be written in one or more storage devices 134, or the application can read the application data stored in the one or more storage devices 134. In this instance, the one or more I/O requests submitted by the application may correspond to one or more read/write operations to be executed to the one or more storage devices 134. Furthermore, an importance level for the received I/O requests may be determined or assigned by operating system 116. In another embodiment, operating system 116 may recognize whether an I/O request that is submitted is an initial I/O request or an I/O request resubmitted responsive to an error recovery process (ERP). For example, performing an I/O request may result in an I/O request error, and in some instances, after analyzing the I/O request error operating system 116 may retry processing the I/O request. Furthermore, the I/O request that resulted in the I/O request error may have been previously rejected by storage controller 132 because storage controller 132 determined that performing the I/O request would exceed a processing delay threshold. In this instance, operating system 116 retries the I/O request, such that the I/O request is not rejected once again.

In step 204, operating system 116 determines whether base device 112 is busy. In this embodiment, operating system 116 determines whether base device 112 is busy (i.e., unavailable to perform the received I/O request) based, at least in part, on whether base device 112 is performing another I/O request received at an earlier time.

If in step 204 operating system 116 determines that base device 112 is not busy, then in step 206, operating system 116 uses base device 112 to send the received I/O request to storage controller 132. In one embodiment, the received I/O request may be sent to storage controller 132 with an I/O delay tolerance flag, as further described in step 214. In another embodiment, the received I/O request may be sent to storage controller 132 with an I/O delay tolerance flag for base device 112. Furthermore, storage controller 132 may execute the received I/O request to one or more storage devices 134, responsive to storage controller 134 determining that executing the received I/O request does not exceed a processing delay threshold. In another instance, storage controller 132 may reject the received I/O request and return status associated with the received I/O request, then operating system 116 may re-queue (i.e., throttle) the received I/O request if base device 112 or a first of a plurality of alias devices 114 is not available in accordance to a throttling scope. Furthermore, the processing delay threshold is determined by storage controller 132 and may vary based on importance level (e.g., higher importance I/O requests may have higher processing delay thresholds than lower importance I/O requests). Operational steps for a manner in which storage controller 132 processes a received I/O request are described in greater detail later in this specification with regard to FIG. 3.

If in step 204 operating system 116 determines that base device 112 is busy, then in step 208, operating system 116 determines whether one of the plurality of alias devices 114 is available to perform the received I/O request. In this embodiment, the first of the plurality of alias devices 114 is available if the first of the plurality of alias devices 114 can be selected and assigned to base device 112 that is busy, such that the first of the plurality of alias devices 114 can perform the received I/O request.

If in step 208 operating system 116 determines that the first of the plurality of alias devices 114 is not available to perform the received I/O request, then in step 220, operating system 116 leaves the received I/O request queued for subsequent processing. In one embodiment, if in step 218 operating system 116 determines that a usage condition for the pool of alias devices 114 is not met, then in step 220, operating system 116 leaves the received I/O request queued for subsequent processing. For example, operating system 116 may perform the I/O request at a later time when base device 112 or the first of the plurality of alias devices 114 becomes available.

If in step 208 operating system 116 determines that the first of the plurality of alias devices 114 is available to perform the received I/O request, then in step 210, operating system 116 determines whether the received I/O request match conditions for throttling. In one embodiment, operating system 116 determines whether the characteristics of the received I/O request match the conditions for throttling (based on importance level, type of I/O operation etc.). In one embodiment, operating system 116 determines whether the received I/O request is being throttled based on feedback indication previously provided by storage controller 132, as described in greater detail later in this specification with regard to FIG. 3.

If in step 210 operating system 116 determines that the type of the received I/O request is being throttled, then in step 218, operating system 116 determines whether a usage condition for the pool of alias devices 114 is met. In this embodiment, the usage condition is implemented to determine whether to allocate a first of the plurality of alias devices 114 from the pool of alias devices 114.

The usage condition may involve determining the type (e.g., importance level) of the received I/O request, and determining a percentage of available alias devices 114 from the pool of alias devices 114. For example, the usage condition for allocating the first of the plurality of alias devices 114 to perform an I/O request may include: if an importance level for the I/O request is 1 and 90% or less of alias devices 114 in the pool of alias devices 114 are in use; if an importance level for the I/O request is 2 and 80% or less of alias devices 114 in the pool of alias devices 114 are in use; if an importance level for the I/O request is 3 and 70% or less of alias devices 114 in the pool of alias devices 114 are in use; if an importance level for the I/O request is 4 and 60% or less of alias devices 114 in the pool of alias devices 114 are in use; and if an importance level for the I/O request is 5 and 50% or less of alias devices 114 in the pool of alias devices 114 are in use. In another embodiment, the usage condition may be variable depending on whether one or more particular importance levels for I/O requests are missing, meeting, or exceeding their respective performance goals.

The usage condition may also be based on another characteristic of the I/O request (i.e., a scope). In this instance, the usage condition may allocate a first of the plurality of alias devices 114 to perform only I/O requests that perform read operations, or I/O requests that perform write operations, or I/O operations that have other characteristics such as the amount of data written or read, or whether a certain feature is used in the I/O request. In this instance, the usage condition may indicate that a write I/O request having an importance level of 3 or greater must be throttled (i.e., not to be performed until the conditions that caused the throttling no longer exist). In this manner, the write I/O request may not be assigned to a first of the plurality of alias devices 114, if 71 or more alias devices 114 the pool of alias devices 114 are in use. Furthermore, since the usage condition did not specify throttling of read I/O requests, a read I/O request associated with any importance level is not subject to the alias usage condition. It should be understood that either storage controller 132 signals operating system 116 that the usage condition for the processing delay in storage controller 132 no longer exists, or operating system 116 may determine to end throttling after a period of time.

If in step 210 operating system 116 determines that the type of the received I/O request is not being throttled, then in step 212, operating system 116 determines whether the received I/O request is a new request. For example, as previously discussed, an application of primary computer system 110 may resubmit an I/O request, responsive to performing an ERP. In this instance, operating system 116 may determine that the resubmitted I/O request is not a new request.

If in step 212 operating system 116 determines that the received I/O request is a new I/O request, then in step 214, operating system 116 sets an I/O processing delay tolerance flag associated with the received I/O request. In this embodiment, the I/O processing delay tolerance flag is set to be associated with the received I/O request, such that, when the received I/O request is sent to storage controller 132 (step 206), storage controller 132 is configured to perform operational steps as described in greater detail later in this specification with regard to FIG. 3.

If in step 212 operating system 116 determines that the received I/O request is not a new I/O request, then in step 216, operating system 116 selects a first of the plurality of alias devices 114 to assign to base device 112 to perform the received I/O request. Furthermore, operating system 116 may assign a first of the plurality of alias devices 112 to base device 112 to perform the received I/O request responsive to setting an I/O request processing delay threshold associated with the received I/O request, as previously described in step 214. A HyperPAV model may be implemented by computing environment 100, such that the first of the plurality of available alias devices 114 is selected from a pool of alias devices 114 and assigned to base device 112. Accordingly, once the first of the plurality of available alias devices 114 completes performing the received I/O request, the first of the plurality of alias devices 114 is returned to the pool of alias devices 114, as previously discussed.

If in step 218 operating system 116 determines that the usage condition for the pool of alias devices 114 is met, then in step 216, operating system 116 selects a first of the plurality of available alias devices 114 to assign to base device 112 to perform the received I/O request.

Figure 3:
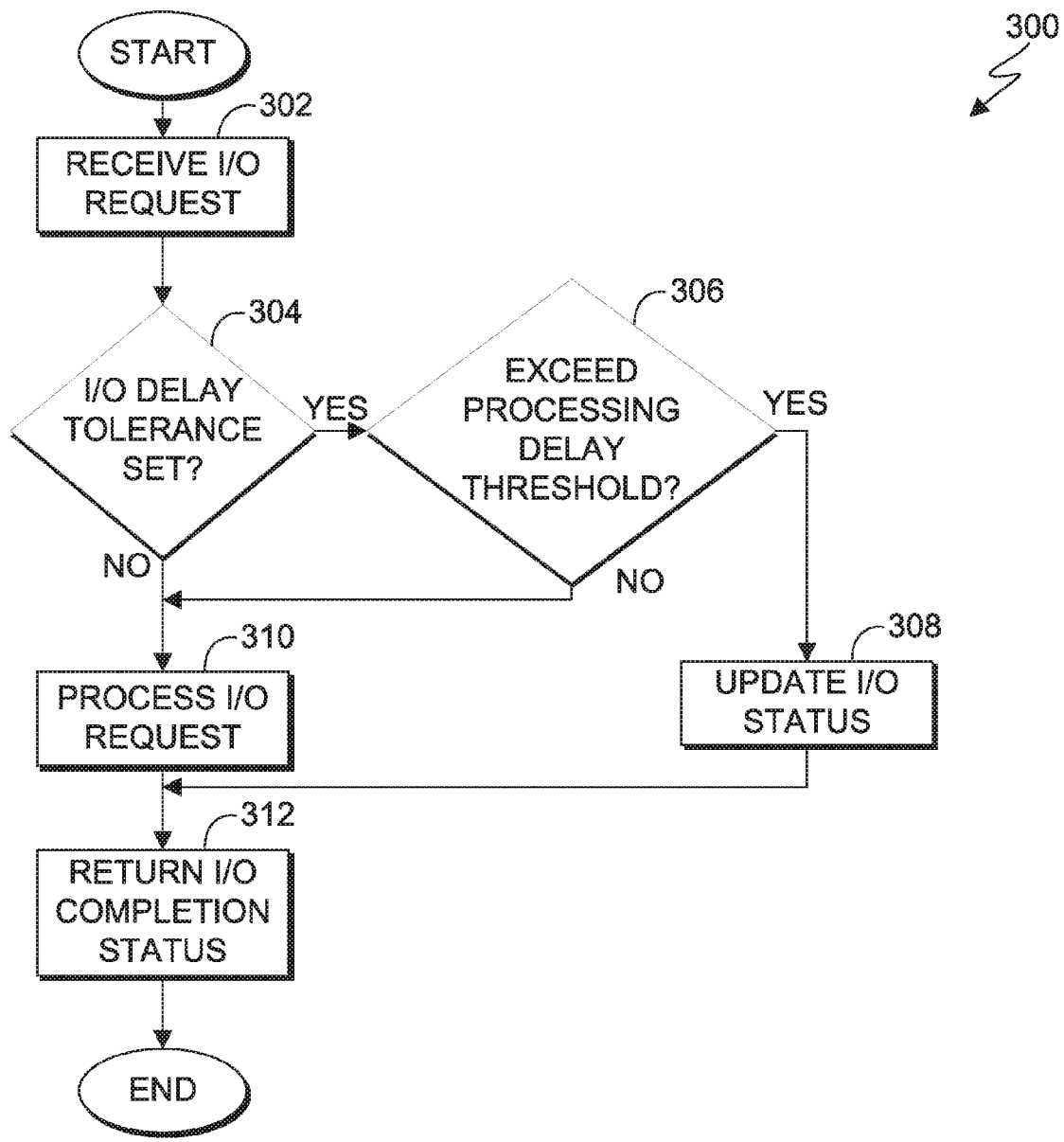
FIG. 3 is a flowchart illustrating operational steps for processing a received I/O request by a storage controller, in accordance with an embodiment of the present invention.

FIG. 3 is a flowchart 300 illustrating operational steps for processing a received I/O request, in accordance with an embodiment of the present invention. In one embodiment, storage controller 132 may determine whether to reject a received I/O request if the received I/O request is associated with a set I/O processing delay tolerance flag, as previously described in step 214 of FIG. 2.

In step 302, storage controller 132 receives an I/O request from operating system 116, as previously discussed in greater detail with regard to step 206 of FIG. 2.

In step 304, storage controller 132 determines whether an I/O processing delay tolerance flag is set for a received I/O request. In one embodiment, the I/O processing delay tolerance flag is set by operating system 116, as previously described in step 214 of FIG. 2.

If in step 304, storage controller 132 determines that the I/O processing delay tolerance flag is not set for the received I/O request, then in step 310, storage controller 132 processes the I/O request. In this embodiment, storage controller 132 starts the I/O request by executing a read/write operation for the I/O request to one or more storage devices 134. In one embodiment, storage controller 132 processes the I/O request subsequent to determining that performing the I/O request will not exceed the processing delay threshold (step 306, "no" branch).

If in step 304, storage controller 132 determines that the I/O processing delay tolerance flag is set for the received I/O request, then in step 306, storage controller 132 determines whether performing an I/O request will exceed a processing delay threshold. For example, storage controller 132 may determine a processing delay threshold based on a condition, such as, how long it takes to de-stage data from components of one or more storage devices 134 (e.g., a cache to a HDD platter) to execute a write operation. In another example, a processing delay threshold may vary based on an importance level for a received I/O request. For example, the processing delay threshold may be implemented to avoid unnecessarily consuming a critical resource (i.e., a first of the plurality of alias devices 114) that may be used to perform another I/O request with a higher importance level. For example, storage controller 132 may process one or more I/O requests having a varying importance level (e.g., one I/O request having an importance level of 1 and another I/O request having an importance level of 5). In this instance, storage controller 132 may reject I/O requests with a low importance level, but not reject I/O requests with a high importance level, to prevent the low importance level from consuming one of the plurality of alias devices 114 from the alias device 114 pool.

If in step 306 storage controller 132 determines that performing the I/O request will exceed the processing delay threshold, then in step 308, storage controller 132 updates an I/O status for the I/O request indicating that storage controller 132 rejects (i.e., throttles) the received I/O request. In one embodiment, the status may indicate a reason for the rejection. Furthermore, characteristics of the I/O request that caused it to be rejected (i.e., a scope of rejection) are also indicated in the appropriate status in an instance where a condition is met or exceeded by an I/O processing delay.

In step 312, storage computer system 132 returns an I/O completion status for the I/O request to operating system 116. In one embodiment, the I/O completion status for the I/O request includes the reason for storage controller 132 rejecting the I/O request. In another embodiment, the I/O completion status may indicate that the I/O request was processed successfully by storage controller 132.

Figure 4:
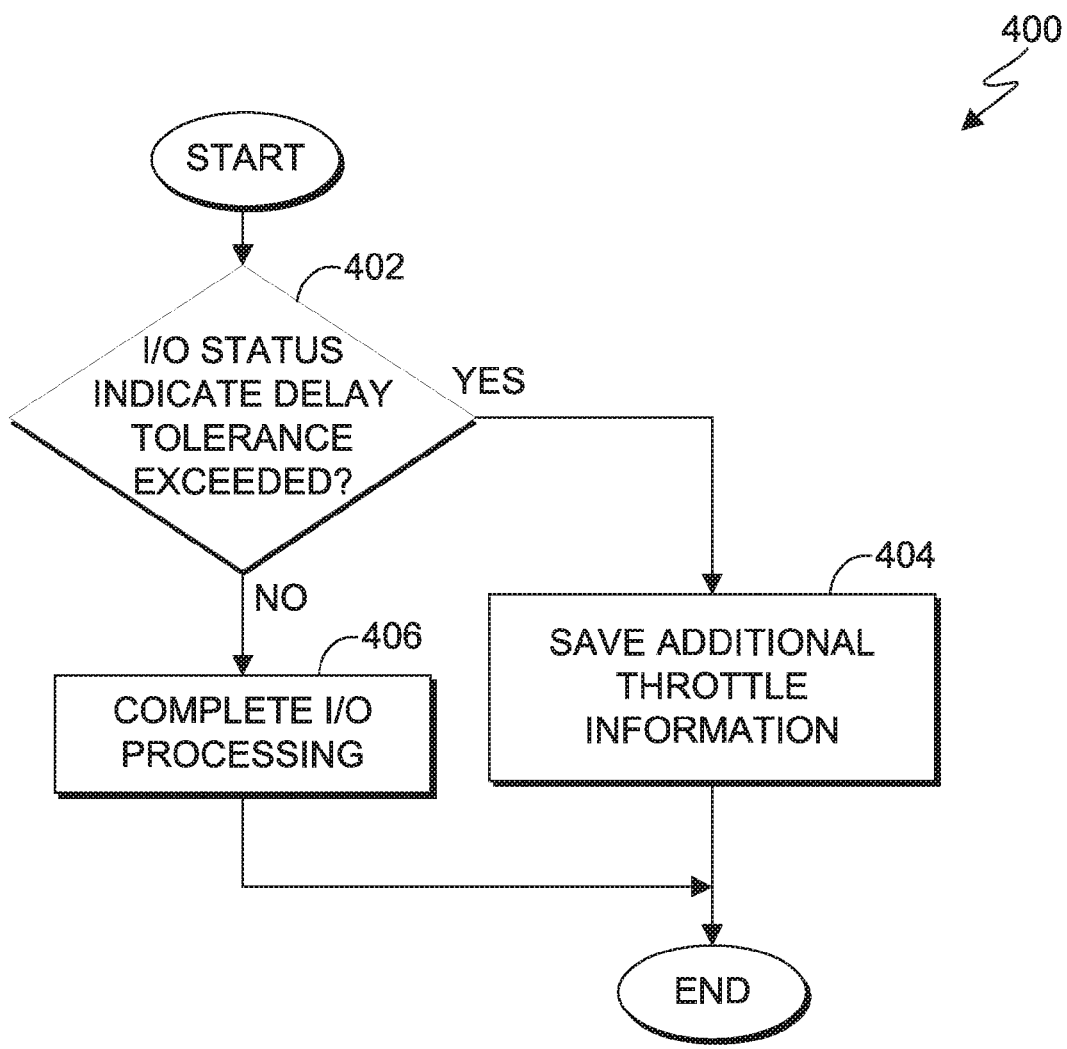
FIG. 4 is a flowchart illustrating additional operational steps for processing a received I/O request, in accordance with an embodiment of the present invention.

FIG. 4 is a flowchart 400 illustrating operational steps for processing a received I/O request. In this embodiment, operating system 116 receives an I/O completion status for a received I/O request and the I/O request from storage controller 132, as previously described in step 312 of FIG. 3.

In step 402, operating system 116 determines whether a completion I/O status for a received I/O request indicates that a processing delay tolerance was exceeded. In this embodiment, the completion I/O status is updated with information indicating whether the processing delay tolerance was exceeded, as previously described in greater detail with regard to step 308 of FIG. 3. Furthermore, operating system 116 examines the completion I/O status to determine whether a processing delay tolerance was exceeded when storage controller 132 began processing the I/O request.

If in step 402 operating system 116 determines that the completion I/O status for the received I/O request indicates that the processing delay tolerance was exceeded, then in step 404, operating system 116 saves additional throttling information for base devices 112 associated with the rejected I/O request. Furthermore, operating system 116 may flag a control block representing base device 112, to indicate that throttling is in effect. For example, the throttling information may describe a scope of the rejection, including: importance levels of I/O requests, which types of I/O requests (e.g., read operations, write operations, etc.), sizes of I/O requests, etc. It should be noted that, if a scope of rejection or additional throttling information is not necessarily specific to a single base device 112 (e.g., the condition affects all devices having certain characteristics or belonging to some type of logical group), a plurality of base devices 112 may be flagged, or other control blocks may be updated.

If in step 402 operating system 116 determines that the completion I/O status for the received I/O request indicates that the processing delay tolerance was not exceeded, then in step 406, operating system 116 completes processing of the I/O request.

Operating system 116 may determine that throttling is no longer in effect for a particular importance level of an I/O request. For example, operating system 116 may test whether throttling is still in effect by periodically flagging an I/O request as eligible for throttling. In one embodiment, this may be accomplished by checking whether storage controller 132 rejects the I/O request that has been indicated as eligible for throttling. In another example, storage controller 132 may provide feedback indicating that a particular importance level or class of I/O requests is no longer being throttled. In one embodiment, this may be accomplished by providing a flag in the status information for the I/O request to indicate whether the particular importance level is being throttled. In another example, storage controller 132 may present unsolicited status for base device 112, such as a unit check with sense data or an attention interrupt, and a corresponding message that must be read by operating system 116 to determine that throttling is no longer in effect. In yet another example, a response time metric may be used to determine whether throttling is no longer in effect. In this instance, the response time metric could be an existing response time metric that already includes the processing delay threshold, such as a disconnect time, or a new response time metric representing the amount of time for the processing delay.

Figure 5:
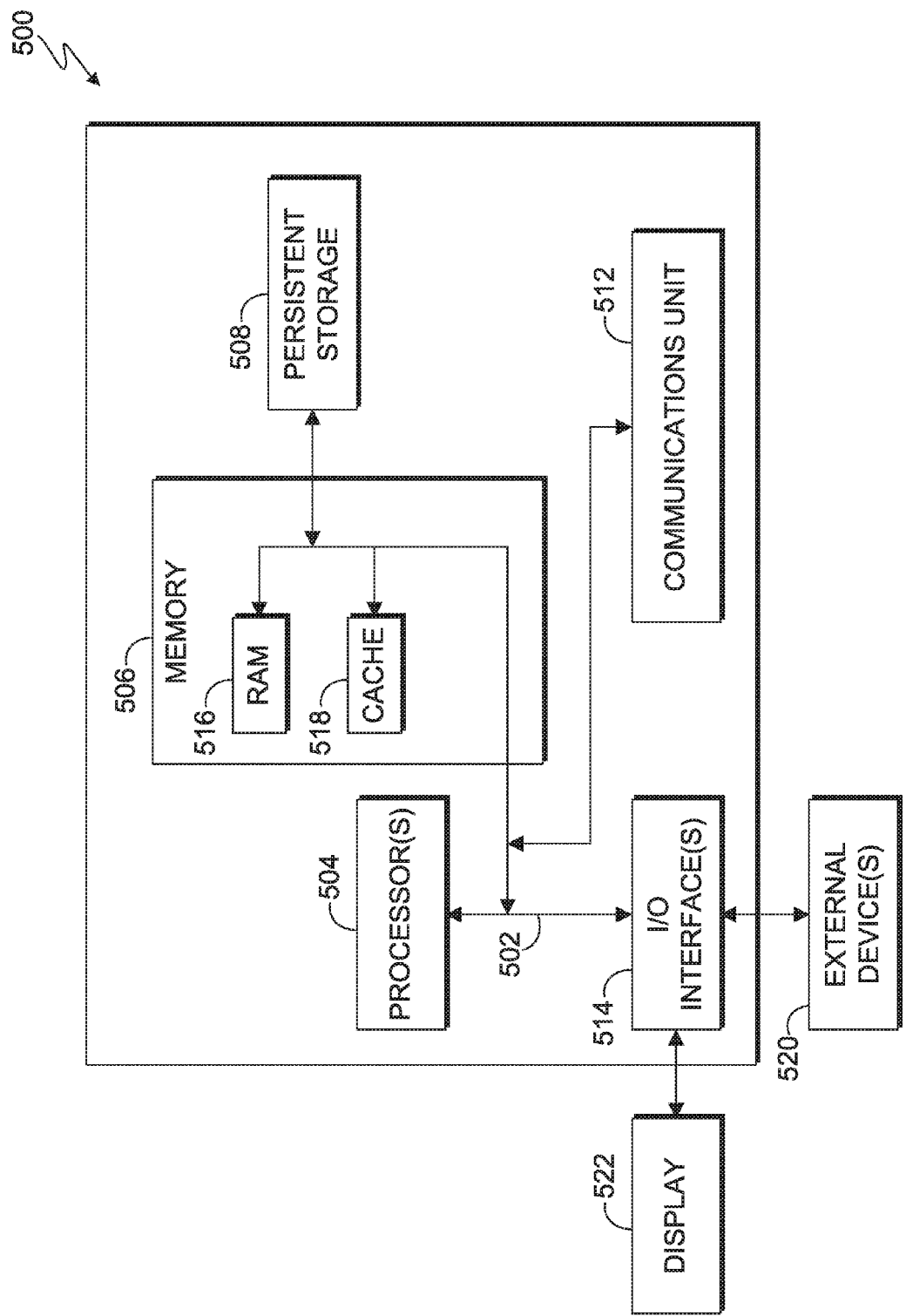
FIG. 5 is a block diagram of internal and external components of the computer systems of FIG. 1, in accordance with an embodiment of the present invention.

FIG. 5 is a block diagram of internal and external components of a computer system 500, which is representative the computer systems of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media. Software is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer-readable storage medium that is also part of persistent storage 508.

Communications unit 512 provides for communications with other computer systems or devices via a network (e.g., network 120). In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 512 (e.g., via the Internet, a local area network or other wide area network). From communications unit 512, the software and data can be loaded onto persistent storage 408.

One or more I/O interfaces 514 allow for input and output of data with other devices that may be connected to computer system 500. For example, I/O interface 514 can provide a connection to one or more external devices 520, such as a keyboard, computer mouse, touch screen, virtual keyboard, touch pad, pointing device, or other human interface devices. External devices 520 can also include portable computer-readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:

receiving, by one or more computer processors, an input/output (I/O) request that indicates a priority for performing the received I/O request by a storage controller;

responsive to determining that a base device is not available to handle the received I/O request, determining, by the one or more computer processors, whether the received I/O request is eligible for performance throttling based on the priority for performing the received I/O request, throttling information received from the storage controller for a previous I/O request, and one or more characteristics of the received I/O request, wherein the one or more characteristics of the received I/O request include: types of write operations for the received I/O request, types of read operations for the received I/O request, and amounts of data involved in one or more write operations or read operations for the received I/O request;

transmitting, by the one or more computer processors, the received I/O request to the storage controller with an indication of whether the received I/O request is eligible for performance throttling;

allocating, by the one or more computer processors, one or more of a plurality of alias devices to the base device based on the priority for performing the received I/O request and a number of the plurality of alias devices in use;

responsive to determining that the throttling information received from the storage controller for the previous I/O request indicates that a request type of the received I/O request is not being throttled, determining, by one or more computer processors, whether the received I/O request is a new request; and responsive to determining that the received I/O request is a new request, flagging, by one or more computer processors, a control block representing the base device, indicating that the received I/O request is eligible for performance throttling.

\* \* \* \* \*